July 20, 1965   O. C. DARACK   3,196,286
TEMPERATURE SENSITIVE CONTROL EQUIPMENT INCLUDING THERMOMETER
WITH SPACED CONTACT TERMINALS AND HAVING A HOUSING
Filed June 22, 1961
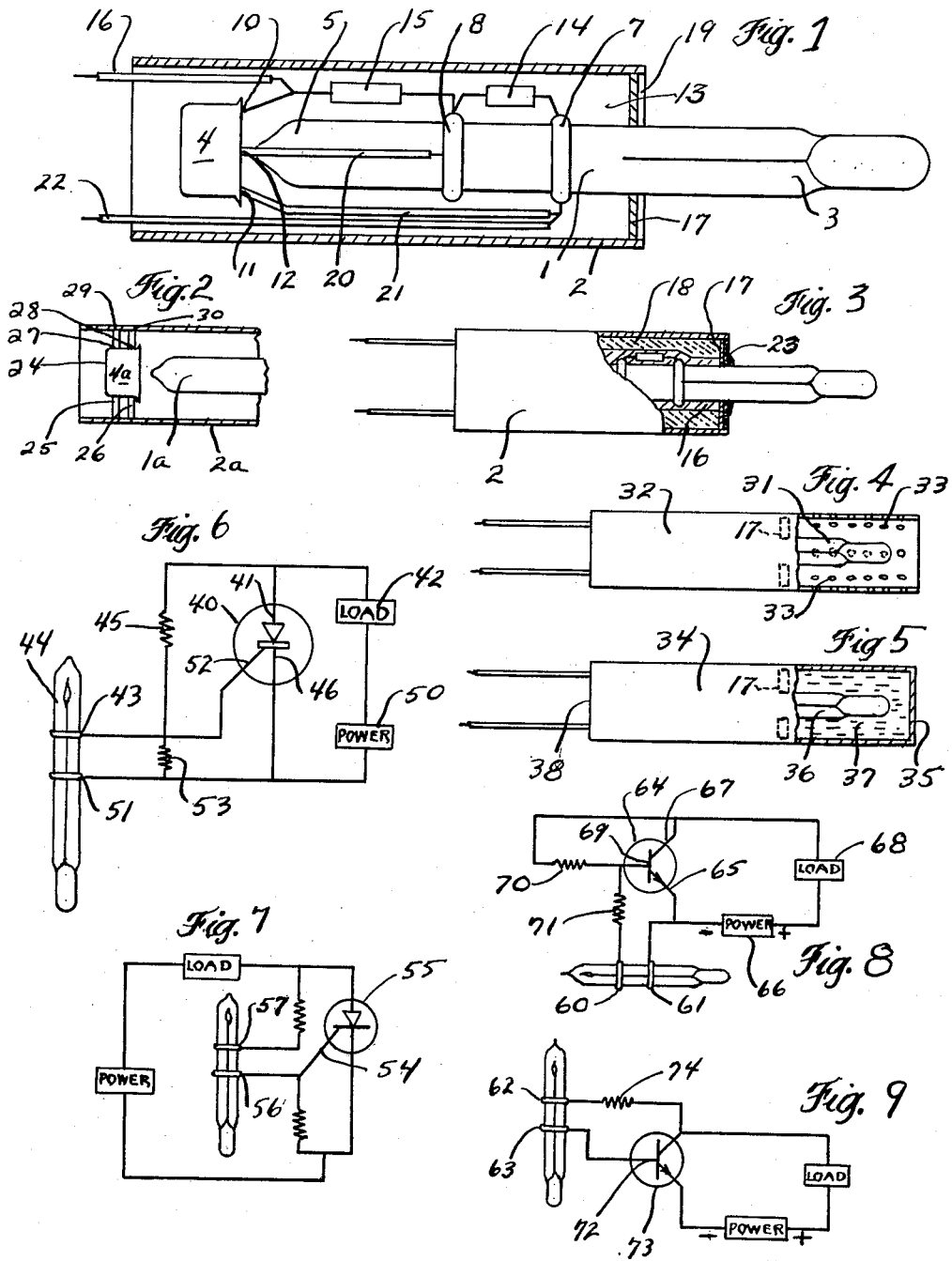
INVENTOR
Oscar C. Darack
BY
Synnestvedt & Lechner
ATTORNEYS

United States Patent Office 3,196,286
Patented July 20, 1965

3,196,286
TEMPERATURE SENSITIVE CONTROL EQUIPMENT INCLUDING THERMOMETER WITH SPACED CONTACT TERMINALS AND HAVING A HOUSING
Oscar C. Darack, Philadelphia, Pa., assignor to Precision Thermometer and Instrument Company, Philadelphia, Pa., a corporation of Pennsylvania
Filed June 22, 1961, Ser. No. 118,908
8 Claims. (Cl. 307—88.5)

This invention relates to electrical control equipment and in particular, relates to equipment which operates as a function of ambient or environmental temperature to energize or de-energize circuit elements.

In one aspect, the invention contemplates the combining of a mercury-in-glass thermostat as a temperature sensor, a power handling semi-conductor device and certain related circuit components in a manner to provide a structure possessing mechanical and functional advantages heretofore not known to the art.

In another aspect, the invention contemplates structure of the kind in question wherein the semi-conductor device, the thermostat and the circuit components are all securely mounted within a rugged metal casing. This has the advantage of providing a control device capable of reliable operation in both industrial and military equipment which is subject to severe vibration, shock, g-forces and the like.

In a further aspect, the invention contemplates the combining of the semi-conductor, the thermostat, and the circuit components in a manner to provide for maximum heat transfer from the structure to the surrounding media. The heat transfer feature is of a special advantage because it enables the equipment to be operated with maximum advantage from the standpoint of power capacity, permits use throughout a wider temperature range and extends the useful life of the device in that breakdown or damage due to heat is minimized.

Another aspect of the invention contemplates a structure wherein all sensitive parts of the components are hermetically sealed within a metal housing. The hermetical sealing feature is of importance because it enables the device to be used in atmospheres which might otherwise be detrimental. Further, in this respect, by judicious choice of the material forming the housing the device can be used in corrosive atmospheres.

In still another aspect, the invention contemplates the combining of the thermostat, the semi-conductor device and the circuit components into a structure which is of minimum size and weight. This feature is of special advantage particularly for military and industrial applications wherein miniaturization for the saving of space and weight is of utmost significance.

In a further aspect, the invention contemplates, in equipment of the kind in question, that the semi-conductor bias be controlled by virtue of the thermostat contacts causing the bias impedance to be energized or de-energized by the source of power which the equipment is adapted to control. This particular arrangement is of special advantage in providing maximum simplicity in circuit design, while at the same time, insuring maximum reliability of control.

In a still further aspect the invention contemplates control equipment which utilizes and takes advantage of the highly desirable features of both a mercury-in-glass thermostat and a semi-conductor device in that the low power capacity of the thermostat is used to control the bias of a semi-conductor having a relatively larger handling power capacity for example a micro-watt of control power vs. several hundred watts output.

A preferred form of the invention will be described in connection with the following drawings wherein:

FIGURE 1 is a diagrammatic plan view, partly in section, of equipment constructed in accordance with the invention;

FIGURE 2 is a similar, but fragmentary, view showing a modification of the equipment of FIGURE 1;

FIGURE 3 is a view partially in section illustrating the components of FIGURE 1 in assembled condition;

FIGURES 4 and 5 illustrate modifications of the equipment of FIGURE 1; and

FIGURES 6 thru 9 are diagrammatic illustrations of the invention as arranged in different circuits.

In FIGURE 1 a typical mercury-in-glass thermostat indicated at 1 is disposed in a housing 2 with the bulb end 3 of the thermostat extending outwardly of the housing. A semi-conductor device 4 is disposed at the opposite end of the casing closely adjacent the column end 5 of the thermostat.

The term mercury-in-glass thermostat or thermostat as used herein contemplates a mercury or mercury-thallinum filled glass thermometer which has a pair of spaced platinum contacts connected to terminals on the outside of the glass. The contacts or terminals are constructed to be electrically connected and disconnected by flow of the mercury within the glass.

In the particular embodiment shown, the semi-conductor device is a silicon controlled rectifier (referred to here and after as SCR) and having the usual anode, cathode, and gate. These elements per se are not shown but their terminals are respectively indicated by the numerals 10, 11, and 12.

The housing is preferably an elongated metal tube having relatively good thermal conductivity, for example, a tube of brass or copper. In certain instances, the housing is made of a material which is selected in accordance with the atmosphere wherein the equipment is to be used, for example, with a corrosive atmosphere the housing is constructed of stainless steel.

It will be observed that the thermostat 1 and the SCR 4 are disposed generally centrally of the housing so as to provide annular space 13. Within the space 13 there is a resistor 14 which is electrically interconnected between thermostat terminals 7 and 8. Also within the space 13 is a resistor 15 electrically connected to the anode 10 of the SCR and the terminal 8 of the thermostat. A lead or conductor 16 is connected to the anode end of the resistor 15 and extend through the space 13 and outwardly of the housing 2. A conductor 20 extends through the space 13 and interconnects the gate 12 and the thermostat terminal 8. A conductor indicated by the numeral 21 interconnects the cathode 11 and the terminal 7 of the thermostat. A conductor 22 is also connected to the terminal 7 and extends through the space 13 outwardly of the housing.

The manner in which the thermostat, the SCR, and the resistors and conductors are mounted within the housing is an important part of the invention and will next be described.

The mounting scheme contemplates that the components be surrounded by a resilient cushion which has the effect of insulating the components against shock. This is done by first assembling the thermostat, SCR, resistors and conductors, in the manner shown. Then with the bulb end masked off, the whole assembly is dipped in a low viscosity, silicon rubber compound so that all of the components are coated. The thickness of the coating may be in the order of 2 or 3 mils. However, thicker coatings are used where the occasion demands.

In FIGURE 3 the resilient coating is diagrammatically illustrated at 16. The preferred material for the coating is Dow-Corning "Silastic."

Incidentally, while in FIGURES 1 and 3 I have shown the resistors and conductors as spaced away from the thermostat, it will be understood that in an actual assembly the resistors and conductors are closely adjacent the glass. After the dipping process is completed, the silicon rubber is cured, for example, as by air-drying.

After the curing of the silicon rubber, a silicon rubber washer 17 is inserted over the bulb end of the thermostat tight over the coating on the glass. The outside diameter of the washer is approximately the same as the inside diameter of the housing. Then the assembly comprising the SCR, the thermostat, etc., is inserted into the housing 2, for example, as is shown in FIGURE 1. The housing is then held in a vertical position (bulb end down) and an epoxy resin is poured into the space 13 until all voids in the space are filled, the pouring continuing until the end of the SCR is completely immersed.

The epoxy is diagrammatically indicated at 18 in FIGURE 3. The space 19 between the washer 17 and end of the tube is also filled with epoxy as indicated by 23 in FIGURE 3. The epoxy is then cured by placing the device in an oven operated at a desired temperature over a specified period of time. The preferred epoxy material is Minnesota Mining "Scotch-Cast" resin #6. The epoxy, when cured, becomes a hard solid mass and rigidly supports the thermostat, SCR, etc., within the housing.

As mentioned above, the silicon rubber coating on the components not only acts as a shock isolator, but is of special advantage in protecting the glass, SCR, and resistor, during the curing of the epoxy in the sense that any expansion of the epoxy will be taken up by the coating and hence the forces are not directed on the glass, etc.

Both the silicon rubber forming the coating and the epoxy should be characterized by being good conductors of thermal energy but non-conductors of electrical energy. As a non-conductor, the silicone and epoxy serve to electrically isolate the components. The requirement of being a good conductor of thermal energy is important in order that any heat developed by the resistors and especially heat developed by the SCR should have relatively little opposition to transfer to the housing 2, which, as mentioned before, is a good conductor or radiator of heat. Thus, by surrounding the SCR and resistors by a medium which will quickly draw off developed heat, thermal damage is less likely to occur and the useful operating temperature and life are thereby enhanced.

In those instances where the power handled by the SCR is relatively large, the invention contemplates additional means for heat conduction. This is shown in FIGURE 2 wherein the housing is indicated by 2a, the thermostat, by 1a and a semi-conductor by 4a. The semi-conductor 4a in FIGURE 2 has a generally cylindrically shaped casing 24 and a pair of washers 25 and 26. The washers 25 and 26 should be characterized by being good conductors of thermal energy and non-conductors of electrical energy. In order to provide the foregoing, the invention contemplates making the washers 25 and 26 of aluminum and anodizing at least the inner peripheral edges 27 and 28 which are in contact with the casing of the SCR. The anodizing provides an oxide which is satisfactory for electrical insulation, yet, accomplishes the objective of good heat conduction.

The washers may be of an outside diameter so that the outer peripheral edges are in intimate contact with the housing. However, in order to relax manufacturing tolerances and to enhance heat conduct across the contact area, the invention contemplates coating the outer peripheral edges 29 and 30 of the washers with a silicon oil, such as Dow 200. This oil has a property of being a conductor of thermal energy but a non-conductor of electric energy and therefore, functions in the desired manner, i.e., electrically isolating the casing of the semi-conductor yet providing for the desired heat transfer. With the oil it is unnecessary to maintain very close tolerances so that there is a tight fit between the washers and the tube. This reduces manufacturing cost and makes for easier assembly.

The device as shown in FIGURE 2 is assembled similarly to the device in FIGURE 1 except as noted following: the semi-conductor, thermostat, resistors, and washers are assembled together and then the outer peripheral edges of the washers and the bulb end of the thermostat are masked off and the assembly dipped to provide for the resilient coating. After the resilient coating is cured and the masks on the washers are removed the silicon oil is applied to the edges and the assembly inserted into the tube, bulb end first. The unit is then turned vertically with the bulb end up. In this instance the epoxy is poured in from the bulb end. After the epoxy has been filled to the top of the tube, the washer 17 is inserted and the unit is reversed in position and then epoxy poured into the other end until the level reaches the end of the tube. The epoxy is then cured.

In FIGURE 4 I have illustrated an arrangement where the bulb end 31 of the thermostat is disposed within the housing 32. In this instance the end of the housing or tube is open and holes 33 are formed in the housing to provide for air circulation. This type of arrangement is desirable in those instances where an exposed thermostat may be subject to being contacted and broken off. The assembly of the structure of FIGURE 4 is the same as described in connection with FIGURES 1 and 3 except for extension of housing 32 to protect bulb end of thermostat.

In FIGURE 5 I have illustrated an arrangement wherein the bulb end of the thermostat is within the housing and is not exposed to the surrounding atmosphere. It will be observed that the housing 34 has a closed end 35 and that the bulb end of the thermostat 36 is surrounded by a silicon oil 37 of the kind mentioned heretofore. The assembly of the structure of FIGURE 5 is similar to that of the structure of FIGURES 1 and 3 except that the housing is filled with oil to a desired level and then the thermostat, semi-conductor, etc. are inserted from the open end 38 with the silicon washer 17 on the bulb end engaged with the surface of the oil. The epoxy is poured in from the open end and then cured.

While I have shown the conductors 16 and 22 in FIGURE 1 as coming out of the end of the housing, it will be apparent that suitable apertures can be provided elsewhere in the housing to accommodate the conductors.

From the foregoing description it will be observed that the semi-conductor and the resistors are within a housing and encased in a hard resinous mass which hermetically seals the semi-conductor and resistors in the sense that the same will be isolated from the effects of moisture, and gases and like undesirable atmospheres.

The invention contemplates that the thermostat and semi-conductor be so coupled that the semi-conductor bias is controlled by the thermostat, which causes the bias impedance to be energized or de-energized by the source of power which the equipment is adapted to control.

FIGURE 6 illustrates a typical circuit arrangement for controlling the supply of half-wave D.C. to a load from an A.C. source.

The SCR 40 has its anode 41 coupled to the load 42. The anode 41 is also coupled to the upper terminal 43 of the thermostat 44 via a resistor 45. The cathode 46 of the SCR is coupled back to the A.C. power source 50 and also to the lower terminal 51 of the thermostat. The gate 52 is coupled to the upper terminal 43 of the thermostat. Between the gate and cathode is a resistor 53 which is in parallel with the terminals 43 and 51 of the thermostat. Assuming that the mercury in the thermostat does not short the terminals 43 and 51, it will be apparent that on each half-cycle a positive potential is applied to the anode and that the voltage divider 45 and 53 causes the gate to be positive with respect to the cathode. The potential developed by the resistor 53 will cause the SCR to conduct and the current from the A.C. source 50 will flow through the load 42 and through the SCR. When the mercury in the thermostat rises to a point so that the terminals 43 and 51 of the thermostat are interconnected, the resistor 53 will be short-circuited so that it no longer develops a bias potential. At this time, the SCR stops conducting, hence, current no longer flows through the load. When the mercury in the thermostat drops so that the terminals 43 and 51 are disconnected, the potential of the resistor 53 is restored and the SCR starts conduction.

The arrangement of FIGURE 6 is especially useful in those instances where power is to be transferred to the load when the temperature falls. Hence the contacts of the thermostat are normally connected by the mercury.

The arrangement of FIGURE 7 is especially useful in those instances where power is to be transferred to the load when the temperature rises. In FIGURE 7 it will be observed that the gate 54 of the SCR 55 will be without bias when the terminals 56 and 57 are not connected by the mercury, so that the SCR will not conduct. Power will not be transferred to the load until the mercury column rises.

As indicated above the circuit arrangements of FIGURES 6 and 7 supply half-wave D.C. to the load from an A.C. source. However, as will be apparent to those skilled in the art, the SCR, the load and the power source can be coupled via rectifiers so that full-wave D.C. and A.C. can be supplied to the load.

In FIGURES 8 and 9 I have illustrated the use of a transistor as the semi-conductor device. In FIGURE 8 the terminals 60 and 61 of the thermostat are normally closed for no power in the load and in FIGURE 9 the terminals 62 and 63 are normally open for no power in the load.

In FIGURE 8 the transistor 64 has the emitter 65 connected to the negative side of the power source 66 and the collector 67 is connected to the load 68. The base 69 is connected to a bias resistor 70 which is also connected to the collector and the load. The base 69 is also connected thru a bias resistor 71 to terminal 60. The terminal 61 is connected to the negative side of the power source. With the terminals 60 and 61 connected by the mercury the resistor 71 will put a negative bias on the base and the transistor will not conduct. As soon as the terminals 60 and 61 are disconnected the negative bias is removed and the resistor 70 will bias the base positive and conduction will begin and power transferred to the load.

In FIGURE 9 it will be seen that with the terminals 62 and 63 disconnected the base 72 of the transistor 73 wil be without bias so that the transistor will not conduct and power will not be transferred to the load. However, when the terminals 62 and 63 are connected by the mercury the resistor 74 will supply a positive bias and the transistor will conduct and power will be transferred to the load.

I claim:
1. Temperature sensitive control equipment comprising:
   a metal, tubular shaped housing;
   a silicon controlled rectifier type semi-conductor device disposed adjacent one end of said housing;
   a thermostat comprising a glass thermometer having a column of mercury and a pair of spaced contacts to be electrically connected and disconnected by the rise and fall of the column, the thermometer being partially disposed within the housing, the device having a cathode, a gate and an anode, the bulb end of the thermometer extending outwardly through one end of the housing and the column end of the thermometer being disposed closely adjacent said semi-conductor device, the thermometer being disposed centrally of the housing to provide for an elongated annular space;
   a resistor disposed in said space and electrically connected between said thermostat contacts;
   first conductor means in said space and connected to the cathode of said semi-conductor device and connected to one of said thermostat contacts, and thence extending outwardly of said housing;
   second conductor means in said space and connected between the other of said thermostat contacts and the gate of said semi-conductor device;
   a second resistor disposed in said space and connected between said other thermostat contact and the anode of said semi-conductor device;
   third conductor means in said space and electrically connected to said anode, the third conductor means extending outwardly of said housing;
   a silicon rubber coating surrounding the parts of said elements which are disposed within said housing; and
   a cured epoxy resin extending between said coating and the inside of said housing and supporting said elements within the housing.

2. Temperature sensitive control equipment comprising:
   a metal, tubular shaped housing;
   a silicon controlled rectifier type semi-conductor device disposed adjacent one end of said housing, the device having a cathode, a gate and an anode;
   a thermostat comprising a glass thermometer having a column of mercury and a pair of spaced contacts to be electrically connected and disconnected by the rise and fall of the column, the thermometer being partially disposed within the housing, the bulb end of the thermometer extending outwardly through one end of the housing and the column end of the thermometer being disposed closely adjacent said semi-conductor device and being disposed centrally of the housing to provide for an elongated annular space;
   a silicone rubber washer extending between said thermometer and the inside of said housing and being disposed closely adjacent said one end of the housing;
   a resistor disposed in said space and electrically connected between said thermostat contacts;
   first conductor means in said space and connected to the cathode of said semi-conductor device and connected to one of said thermostat contacts and thence extending outwardly of said housing;
   second conductor means in said space and connected between one of said thermostat contacts and the gate of said semi-conductor device;
   a second resistor disposed in said space and connected between said one thermostat contact and the anode of said semi-conductor device;
   third conductor means in said space and electrically connected to said anode, the third conductor means extending outwardly of said housing;
   a silicone rubber coating surrounding the parts of said elements which are disposed within said housing; and
   a cured epoxy resin extending between said coating and the inside of said housing and also between said washer and said other end and supporting said elements within the housing.

3. In temperature sensitive control equipment:
   an elongated, hollow metal housing;
   a semi-conductor device having a bias terminal and a pair of load-current terminals, the device being disposed adjacent one end of the housing and the device being for use in controlling current to a load;
   a thermostat comprising a glass thermometer having a column of mercury and a pair of spaced contacts to be electrically connected and disconnected by the rise and fall of the column, the thermometer being at least partially disposed in said housing and the column end of the thermometer being disposed closely adjacent said semi-conductor device, the contacts being for use in controlling the bias on said semi-conductor device;

electrical connections connected between said terminals and said contacts including resistor means connected with said contacts and with said bias terminal for controlling the bias on said bias terminal in accordance with the rise and fall of said mercury column; and means supporting said device, said connections and said thermostat in said housing, the supporting means being characterized by being a conductor of thermal energy and a non-conductor of electrical energy.

4. In temperature sensitive control equipment:

an elongated, hollow metal housing;

a semi-conductor device having a bias terminal and a pair of load-current terminals, the device being disposed adjacent one end of the housing and the device being for use in controlling current to a load;

a thermostat comprising a glass thermometer having a column of mercury and a pair of spaced contacts to be electrically connected and disconnected by the rise and fall of the column, the thermometer being at least partially disposed in said housing and the column end of the thermometer being disposed closely adjacent said semi-conductor device, the contacts being for use in controlling the bias on said semi-conductor device;

electrical connections connected between said terminals and said contacts including resistor means connected with said contacts and with said bias terminal for controlling the bias on said bias terminal in accordance with the rise and fall of said mercury column;

a coating made of resilient material surrounding the parts of said device, said electrical connections and said thermostat which are disposed within the housing; and a resinous mass extending between said coating and the inside of said housing, the resilient material and the resinous mass each being characterized by being a conductor of thermal energy and a non-conductor of electrical energy.

5. In temperature sensitive control equipment:

an elongated, hollow metal housing;

a semi-conductor device having a bias terminal and a pair of load-current terminals, the device being disposed adjacent one end of the housing and the device being for use in controlling current to a load and the device having a metal casing;

a thermostat comprising a glass thermometer having a column of mercury and a pair of spaced contacts to be electrically connected and disconnected by the rise and fall of the column, the thermometer being at least partially disposed in said housing, the column end of the thermometer being disposed closely adjacent said semi-conductor device, the contacts being for use in controlling the bias on said semi-conductor device;

electrical connections connected between said terminals and said contacts including resistor means connected with said contacts and with said bias terminal for controlling the bias on said bias terminal in accordance with the rise and fall of said mercury column;

means supporting said thermostat and said connections in said housing; and mechanism extending between and mechanically connecting said housing and the casing of said device, the mechanism being characterized by being a conductor of thermal energy and a non-conductor of electrical energy and the mechanism supporting the semi-conductor device in the housing.

6. In temperature sensitive control equipment:

an elongated, hollow metal housing;

a semi-conductor device having a bias terminal and a pair of load-current terminals, the device being disposed adjacent one end of the housing, the device being for use in controlling current to a load and the device having a metal casing;

a thermostat comprising a glass thermometer having a column of mercury and a pair of spaced contacts to be electrically connected and disconnected by the rise and fall of the column, the thermometer being at least partially disposed in the housing, the column end of the thermometer being disposed closely adjacent said semi-conductor device, the contacts being for use in controlling the bias on said semi-conductor device;

electrical connections connected between said terminals and said contacts including resistor means connected with said contacts and with said bias terminal for controlling the bias on said bias terminal in accordance with the rise and fall of said mercury column;

means supporting said connections and said thermostat in said housing;

means made of aluminum extending between said semi-conductor casing and the inside of said housing;

an anodized surface on said aluminum means and engaged with said casing; and a silicon oil mass between said aluminum means and the inside of said housing, the aluminum means, the anodized surface and the oil mass functioning as heat transfer means between the semi-conductor device and said housing.

7. In a temperature sensitive control equipment:

a hollow metal housing;

a semi-conductor device having a bias terminal and a pair of load-current terminals, the device being disposed adjacent one end of the housing and the device being for use in controlling current to a load;

a thermostat comprising a glass thermometer having a column of mercury and a pair of spaced contacts to be electrically connected and disconnected by the rise and fall of the column, the contacts being for use in controlling the bias of said semi-conductor device;

electrical connections connected between said terminals and said contacts including resistor means connected with said contacts and with said bias terminal for controlling the bias on said bias terminal in accordance with the rise and fall of said mercury column; and means supporting said device and said connections in said housing, the means being characterized by being a conductor of thermal energy and a non-conductor of electrical energy.

8. In temperature sensitive control equipment:

a hollow metal housing;

a semi-conductor device having a bias terminal and a pair of load-current terminals, the device being disposed adjacent one end of the housing, the device being for use in controlling current to a load;

a thermostat comprising a glass thermometer having a column of mercury and a pair of spaced contacts to be electrically connected and disconnected by the rise and fall of the column, the contacts being for use in controlling the bias of said semi-conductor device;

electrical connections connected between said terminals and said contacts including resistor means connected with said contacts and with said bias terminal for controlling the bias on said bias terminal in accordance with the rise and fall of said mercury column;

a coating made of resilient material surrounding the parts of said device and said connections which are disposed within the housing; and a resinous mass extending between said coating and the inside of said housing, the resilient material and the resinous mass each being characterized by being a conductor of thermal energy and a non-conductor of electrical energy.

References Cited by the Examiner

UNITED STATES PATENTS

| | | | |
|---|---|---|---|
| 2,046,578 | 7/36 | Parks et al. | 236—68 X |
| 2,857,558 | 10/58 | Fiske | 317—101 |
| 2,967,924 | 1/61 | Friend | 310—8.9 X |

OTHER REFERENCES

"A Survey of Some Circuit Applications of the Silicon Controlled Switch and Silicon Controlled Rectifier," published by Solid State Products, Inc., in Bulletin D420-02-8-59 (*August* 1959).

ARTHUR GAUSS, *Primary Examiner.*

JOHN W. HUCKERT, *Examiner.*

UNITED STATES PATENT OFFICE
CERTIFICATE OF CORRECTION

Patent No. 3,196,286                                                            July 20, 1965

Oscar C. Darack

It is hereby certified that error appears in the above numbered patent requiring correction and that the said Letters Patent should read as corrected below.

Column 5, line 63, after "housing" insert -- , the device having a cathode, a gate and an anode --; lines 68 and 69, strike out "the device having a cathode, a gate and an anode,"; column 8, lines 39 and 62, for "bias of", each occurrence, read -- bias on --.

Signed and sealed this 22nd day of February 1966.

(SEAL)
Attest:

ERNEST W. SWIDER
Attesting Officer

EDWARD J. BRENNER
Commissioner of Patents